Feb. 27, 1923. 1,446,625
H. L. MENDAL
SIFTER
Filed Jan. 17, 1922
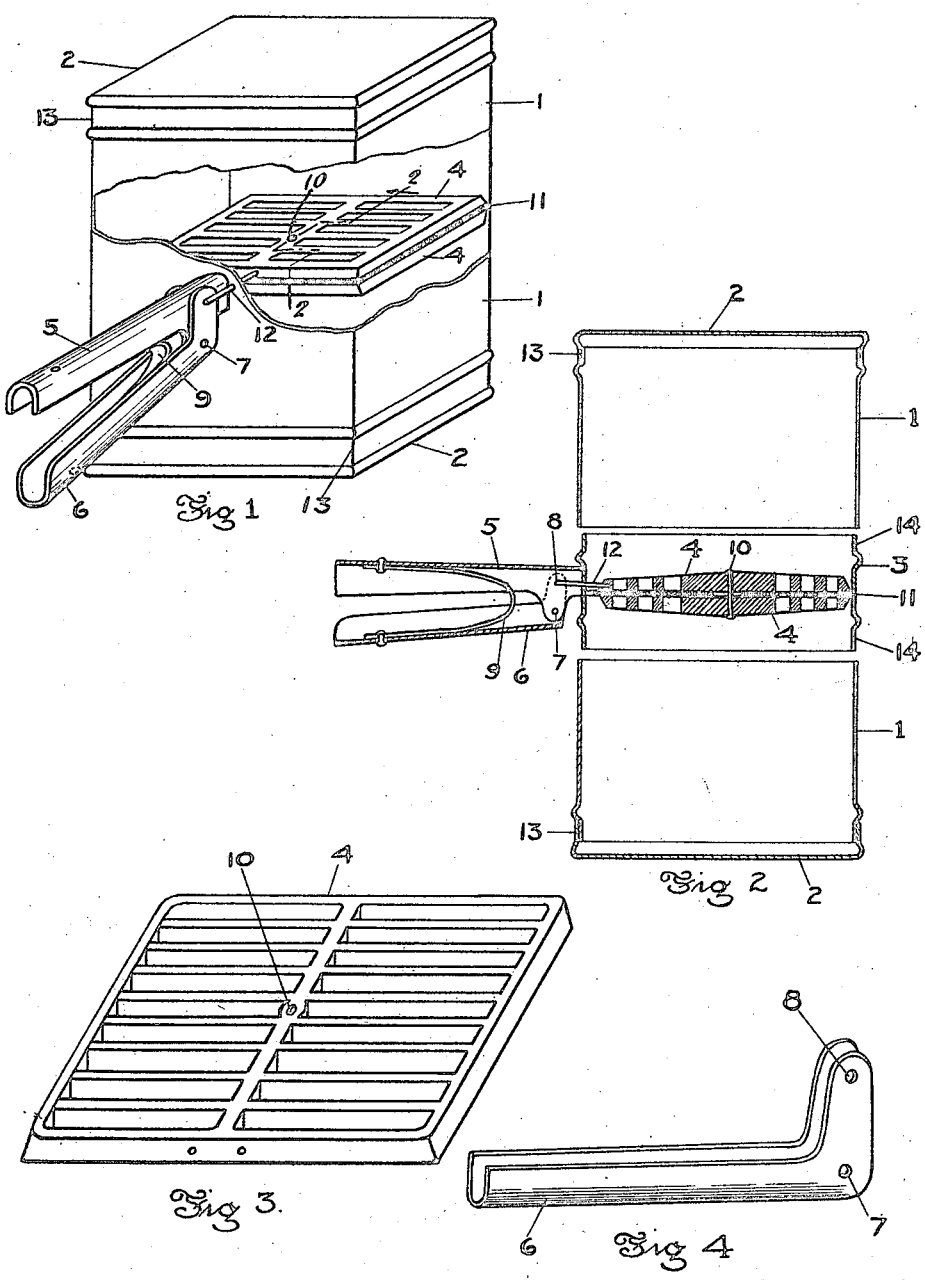

Patented Feb. 27, 1923.

1,446,625

UNITED STATES PATENT OFFICE.

HENRY L. MENDAL, OF BALTIMORE, MARYLAND.

SIFTER.

Application filed January 17, 1922. Serial No. 529,911.

*To all whom it may concern:*

Be it known that I, HENRY L. MENDAL, a citizen of the United States, residing at Baltimore city, and State of Maryland, have invented a new and useful Sifter, of which the following is a specification.

This invention relates to household sifters especially designed for sifting flour, meal, salt, or other ingredients requiring sifting. The invention has for its object to provide a device of this character of generally improved and simplified construction embodying a rectangular sectional body, in which the sifting device is operably mounted and having both ends open and adapted to be closed by removable covers, and more especially designed to be operated with one hand.

The objects of my invention are:

1. To provide a sifter that is reversible, in order to sift the ingredients as many times as desired, keeping the material within the sifter, until ready to remove.

2. To provide a sifter that can be operated with one hand; also, to sift flour and the like without spilling the material, when the sifter is placed upon any object after using.

3. To provide a sifter made in sectional parts, for the convenience of cleaning same.

In the accompanying drawing Fig. 1 is a perspective view of my device partly in section, with all the parts assembled for use. Fig. 2, is a vertical cross sectional view illustrating the parts in detail.

Fig. 3, illustrates one of the agitators. Fig. 4, is a view of the lever-handle. Referring to the drawing in detail, wherein similar numerals designate corresponding parts throughout the several views, the numerals 1 and 3 indicate the sectional body parts, which are preferably rectangular formation, with open ends. A screen, or apertured partition 11 is secured centrally within the body section 3 by means of soldering the edges of the screen to the walls of the body section 3. In case aluminum ware be used for making the sifter, the edges of the screen turned to a right angle to conform to the contour of the body in order to rivet the edges of screen to the walls of the body section 3.

The agitators 4, 4, or rubbers for the screen are operable against the side faces of the partition 11. These agitators being cast are of one piece, and have openings only between the bars or rubbers, and the apertures in center and at one side of agitators. The connecting rod 12 is affixed to one end of the lever handle 6 while the other end of rod 12 is attached to the side of one of the agitators 4. Said agitators being connected by a retaining pin 10. The said retaining pin 10 extending through the agitators, and the screen 11. The retaining pin being riveted to hold the agitators firmly against the faces of the screen 11. These agitators being connected, are actuated simultaneously by the lever handle 6. The stationary handle 5 is secured to the outer surface of section 3 either by solder or rivets. The lever handle 6 is affixed to the stationary handle 5 by the pivot 7. The spring plate 9 is adjustable between the handles 5 and 6. Removable covers 2, 2, are provided for the open ends of the body 1, 1. The covers having flanges 13 frictionally engaging the ends of said body. The body sections 1, 1, are fitted over the flange 14 of the body section 3.

In Fig. 2 of drawings the illustrated sectional parts of the body are shown. The body section 3 contains the screen, or apertured partition 11, also the agitators 4, 4. The object in forming the body in sections, is for the convenience of assembling the parts, also to utilize the small pieces of material, as well as for convenient cleaning purposes.

In Fig. 2 of the drawings, it will be observed, the agitator is formed with risers of different heights; while near the sides, the risers are nearly flat. This feature is arranged to prevent the flour packing against the walls of the body, as the agitators are moved to and fro. In Fig. 3 only one agitator is shown, as these agitators being identical in form, it is thought one illustration would suffice.

In reducing my invention to practice, it is intended to form the different parts, either in tin or aluminum. The stationary handle 5 is secured to the outer side of section 3. The pivot 7 acts as a fulcrum for the lever handle 6. The agitators 4, 4, are actuated by this lever handle, by a connecting rod affixed to the agitator 4, and the lever handle 6. In the center of the screen 11 there is an oblong aperture, for the pivot connecting the agitators to guide freely when the agitators are in operation.

Having fully described my invention, the operation is as follows:—

Remove the cover at one end of the sifter, place flour or other material within this end, replace the cover, press the handles together, then release the grip of the handles; repeating the operation, until the material has passed to the lower end of the sifter. If desirable to sift the material several times, invert the sifter after each operation until the ingredients are thoroughly incorporated.

When sifting a small quantity of flour at a time, leave one of the covers off, and after sifting the quantity needed, allow the sifter to rest upon the closed end. This will prevent any material falling through the sifter.

While I have herein illustrated and described structural details embodying my invention, it is understood that the invention is not limited to the particular form and arrangements of the several parts, which may be modified within the scope of the appended claims, without departing from the spirit of my present invention.

Having thus described my invention, what I claim is:—

1. A sifter comprising a rectangular shaped body part, open at each end; closures for said open ends, an apertured partition secured centrally within said body, reciprocating agitators to operate on each face of said apertured partition, a stationary handle secured to outer surface of said body, a lever handle affixed to said stationary handle by a pivot at elbow of said lever handle, an adjustable spring plate to operate between said handles, a connecting rod between said lever handle and the said agitators operating in a parallel line to said handles, as shown and specified.

2. In a sifter; comprising a cross sectional rectangular shaped body open at each end, removable closures for said open ends, a screen secured centrally within the middle section of said body part, reciprocating agitators operatively mounted on opposite sides of said screen, a stationary handle secured to outer surface of said body part, a lever handle affixed to said stationary handle by a pivot at elbow of said lever handle, an adjustable spring plate to operate between said handles, a rod connecting said lever handle with said agitators to actuate same.

3. A sifter comprising a hollow cross sectional rectangular body part, open at each end; removable closures for each open end, a sieve secured centrally within the middle section of said body part, reciprocating agitators operatively mounted on opposite sides of said sieve, a stationary handle secured to outer surface of said body part, a lever handle affixed to said stationary handle by a pivot at elbow of said lever handle, an adjustable spring plate to operate between said handles, a rod connecting said lever handle with said agitators to actuate same, said agitators being provided with risers of unequal height for the purpose shown and described.

HENRY L. MENDAL.

Witnesses:
J. K. E. DIFFENDERFFER,
CRAWFORD I. SMITH.